United States Patent [19]

Bohle

[11] 4,197,639
[45] Apr. 15, 1980

[54] GLASS CUTTER

[75] Inventor: Ulrich Bohle, Solingen, Fed. Rep. of Germany

[73] Assignee: Josef Bohle, Solingen, Fed. Rep. of Germany

[21] Appl. No.: 965,675

[22] Filed: Dec. 1, 1978

[30] Foreign Application Priority Data

Dec. 1, 1977 [DE] Fed. Rep. of Germany ....... 2753527

[51] Int. Cl.² ............................................. C03B 33/10
[52] U.S. Cl. ................................................. 30/164.95
[58] Field of Search ....................... 30/164.95; 83/886; 225/103

[56] References Cited

U.S. PATENT DOCUMENTS

| 1,419,310 | 6/1922 | Ryther | 30/164.95 |
| 3,221,405 | 12/1965 | Bohle | 30/164.95 |
| 4,028,801 | 6/1977 | Gelfman | 30/164.95 |

FOREIGN PATENT DOCUMENTS 1063769  8/1959  Fed. Rep. of Germany ........ 30/164.95

*Primary Examiner*—Jimmy C. Peters
*Attorney, Agent, or Firm*—John C. Smith, Jr.

[57] ABSTRACT

A glass cutter includes a head at one end, a manipulator at the opposite end, a casing arranged at the head and defined by a support plate and a circular cover plate firmly connected thereto, a plurality of cutting discs supported circularly and rotatably between the support plate and the circular cover plate, of which cutting discs always one is in readiness for cutting. The casing of the cutting discs is retained exchangeable in an elongated recess at the head of the glass cutter and the support plate is formed multi-edged at the perimeter. The support plate of the cutting discs engages with two flattened faces parallel to one another at lateral confinements of the recess which defines an arc at its inner end at the head of the glass cutter. Two opposing grooves parallel to the lateral confinements of the recess are associated with the recess in advance thereof for accommodating the portions of the stand-by cutting discs projecting relative to the casing of the cutting discs. The cover plate of the casing is guided fitting into a free space confined by the outer limb of the groove. The casing of the cutting discs passes through an edge cutout of the head of the glass cutter with a screw, a knurled nut being guided on the screw and capable of being tightened against the head of the glass cutter.

2 Claims, 8 Drawing Figures

U.S. Patent   Apr. 15, 1980   4,197,639
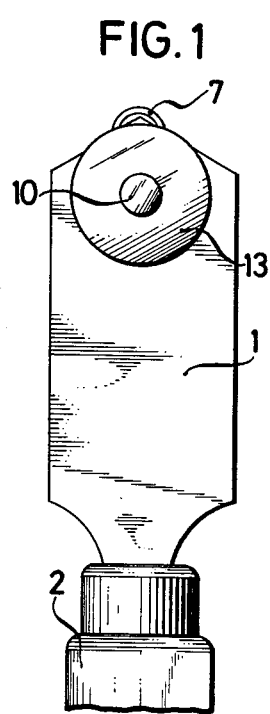
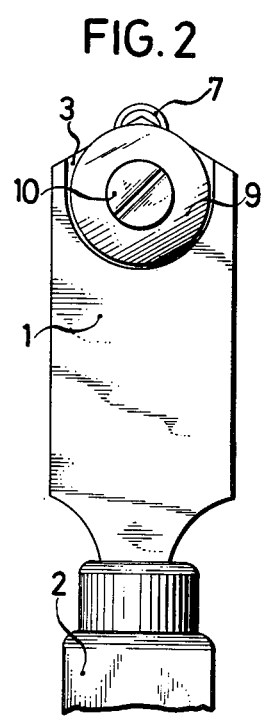
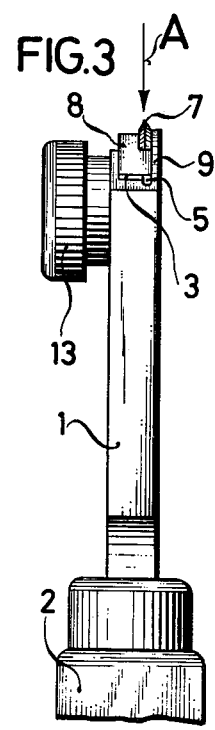
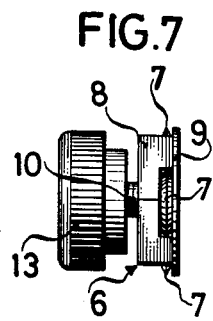
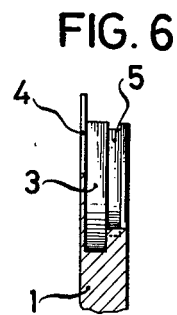
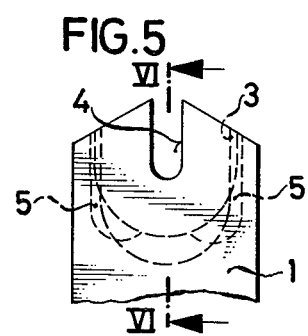
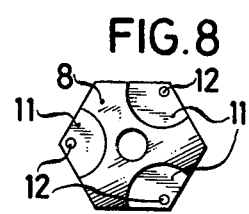
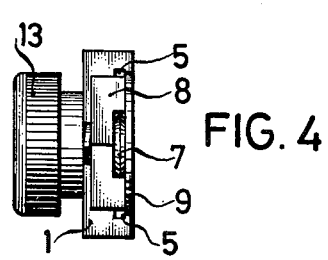

GLASS CUTTER

BACKGROUND OF THE INVENTION

This invention relates to a glass cutter including a plurality of cutting discs supported circularly and rotatably between a support plate and a circular cover plate firmly connected thereto, of which cutting discs always one is in readiness for cutting, the casing of the cutting discs defined by the support plate and the cover plate being retained exchangeable in an elongated recess at the head of the glass cutter and the support plate being formed multi-edged at the perimeter.

Such devices are known from German patent specifications No. 1,063,769 and No. 1,237,274.

In one of the prior art glass cutters the casing of the cutting discs is guided rotatable in the recess at the head of the glass cutter and the retaining of the casing in the recess is effected by means of a clamp plate capable of being screwed to the head of the glass cutter, said clamp plate having bent-off portions as the two longitudinal edges thereof, with which it engages at two faces parallel to one another of the plate of the casing facing it. By an engagement of the clamp plate at edge faces of the plate of the casing facing it, a proper and unmovable seating of the cutting disc respectively advanced into the working position is insured. Such glass cutters, have essential disadvantages, however. The shifting of a cutting disc into the working position is complicated and time-consuming because on the one hand for doing so the casing of the cutting discs and the clamp plate must be aligned relative to one another, which is rendered difficult by the movability of the two parts. On the other hand, the clamp plate prior to each shifting of any new cutting disc into the working position must previously be released and subsequently screwed to the head of the glass cutter again. The arrangement of the clamp plate furthermore results in an increase of the production cost of such glass cutters. Finally, such glass cutters are prone to the disadvantages that the stand-by cutting discs are subject to contamination with a glass cutter taken into use by residue of putty or the like, which possibly has as a result a jamming of the cutting discs on their shafts.

A glass cutter having two cutting discs opposing each other is also already known, the cutting discs being supported in a casing made integrally of a flexible material, the casing having two guides by means of which the casing is capable of being pushed onto the bifurcated head of the glass cutter. After wearing of the cutting disc positioned in the working position, the casing on the head of the glass cutter is re-applied, thereby the second cutting disc being in readiness for a cutting operation. Since the casing as a result of its production of flexible material assumes a clamp seat on the bifurcated ends of the head of the glass cutter, no additional clamp or screw elements are required for retaining the casing on the head. Such glass cutters, however, are able to be equipped with two cutting discs only, and this has proven to be a disadvantage in practice, and similarly, the stand-by cutting disc is subject to contamination. Furthermore, a proper supporting of the shafts of the cutting discs in the casing is not possible because of the production of the casing of flexible material, because the shaft of the cutting disc disposed in the working position upon performing a cutting operation is urged into the material as a result of the pressure thereby occurring. The result thereof is a displacement of the cutting disc from the working position, so that no proper cut is able to be performed with the cutting disc any more. In order to counteract this deficiency, the shafts of the cutting discs have been supported in holes of a metallic plate in such glass cutters, in order to prevent a displacement of the shafts in this way. A non-displaceable supporting of the shafts, however, results in a not immaterial cost increase of such glass cutters.

SUMMARY OF THE INVENTION

An object of this invention is to simplify the shifting of the cutting disc into the working position and the retaining of the casing of the cutting discs at the head of the manipulator of the glass cutter in a glass cutter of the species set forth initially and to furthermore avoid a contamination of the stand-by cutting discs.

According to the invention, it is provided for that the support plate of the cutting discs engages with two flattened faces parallel to one another at lateral confinements of the recess which defines an arc at its inner end at the head of the glass cutter; two opposing grooves parallel to the lateral confinements of the recess are associated with the recess in advance thereof for accommodating the portions of the stand-by cutting discs projecting relative to the casing of the cutting discs; the cover plate of the casing is guided fitting into a free space confined by the outer limb of the groove, and the casing of the cutting discs passes through an edge cut-out of the head of the glass cutter with a screw, a knurled nut being guided on the screw and capable of being tightened against the head of the glass cutter.

In order to shift a stand-by cutting disc into cutting readiness after wearing of the cutting disc disposed in the working position, the knurled nut must merely be released slightly, thereafter the casing being able to be removed from the recess at the head of the manipulator of the glass cutter and then being turned so far until a stand-by cutting disc is positioned in readiness for cutting. Thereafter, the casing is again pushed into the recess, and the knurled nut is again tightened, the casing then being secured in the recess against rotating and shifting and the cutting disc thus being secured in its working position. The stand-by cutting discs are substantially protected against contamination as a result of their positions with their portions projecting relative to the casing, in the grooves, and by the cover plate of the casing of the cutting discs provided above the grooves.

An advantageous development of the glass cutter according to the invention is that the support plate of the cutting discs has a number of recesses corresponding to the number of cutting discs at the broad side facing the cover plate, in which recesses the cutting discs are supported on their shafts and from which they only project with a portion of their cutting edges.

The recesses of the support plate together with the cover plate define open chambers only at the edge of the casing. The accommodation of the cutting discs in these chambers contributes to prevent a contamination of the stand-by cutting discs upon using the glass cutter.

BRIEF DESCRIPTION OF THE DRAWING

An embodiment of the invention will now be described by way of example and with reference to the accompanying drawing in which:

FIG. 1 is a fragmentary plan view of one broad side of a glass cutter according to the invention;

FIG. 2 is a plan view of the other broad side of the glass cutter;

FIG. 3 is a side elevational view thereof;

FIG. 4 is an end view in direction of the arrow A;

FIG. 5 is the head of the glass cutter drawn in part without cutting discs, in a plan view upon the one broad side;

FIG. 6 is a sectional view taken along line VI—VI of FIG. 5;

FIG. 7 is the casing of the cutting discs with the knurled nut in an elevational view, and FIG. 8 is the support plate of the cutting discs in a plan view upon one broad side.

DESCRIPTION OF THE PREFERRED EMBODIMENT

Referring to the drawing, wherein like reference numerals designate like or corresponding parts throughout the several views, there is shown a glass cutter comprising a head 1 and a manipulator 2. The head 1 has an elongated recess 3 terminating at the front end of the head 1 and defining an arc at the rear end, as well as an edge cutout 4 in the area of the recess 3. With the recess 3, there are associated two opposing grooves 5 extending parallel to the longitudinal edgewise confinements of the recess 3, said grooves terminating in an arc at their rear ends. Instead of the two grooves, if required, only one groove may also be provided which in this case is formed according to the edge course of the recess 3. The reference numeral 6 designates a casing for three cutting discs 7, said casing being defined by a support plate 8 and a cover plate 9. The support plate 8 and the cover plate 9 are firmly connected to one another by means of a screw 10 and rotatable about the smooth shank of the screw 10. The support plate 8 has three recesses 11 at its broad side facing the cover plate 9, the cutting discs 7 being supported rotatably in said recesses on shafts 12. The cutting discs 7 are for the major part covered by the cover plate 9. The support plate 8 is guided non-rotatably in the recess 3 of the head 1 of the glass cutter with two faces opposing each other. In this position, one cutting disc 7 is in readiness for cutting, while the stand-by cutting discs 7 are disposed protected against contamination with their portions projecting relative to the casing 6 in the grooves 5. The cover plate 9 terminates flush at the broad side with the head 1 of the glass cutter. The screw 10 of the casing 6 of the cutting discs 7 passes through the edge cutout 4 of the head 1 with its threaded end and is provided with a knurled nut 13. Upon tightening of the knurled nut 13 against the head, the casing 6 of the cutting discs 7 is secured against an unintentional shifting.

The invention may be embodied in other specific forms without departing from the spirit or the essential characteristics thereof. The embodiment is therefore to be considered in all respects as illustrative and not restrictive.

What is claimed is:

1. A glass cutter including a head at one end, a manipulator at the opposite end, a casing arranged at the head and defined by a support plate and a circular cover plate firmly connected thereto, a plurality of cutting discs supported circularly and rotatably between the support plate and the circular cover plate, of which cutting discs always one is in readiness for cutting, the casing of the cutting discs being retained exchangeable in an elongated recess at the head of the glass cutter and the support plate being formed multi-edged at the perimeter, wherein the support plate (8) of the cutting discs (7) engages with two flattened faces parallel to one another at lateral confinements of the recess (3) which defines an arc at its inner end at the head of the glass cutter; two opposing grooves (5) parallel to the lateral confinements of the recess (3) are associated with the recess in advance thereof for accommodating the portions of the stand-by cutting discs projecting relative to the casing of the cutting discs (7); the cover plate (9) of the casing is guided fitting into a free space confined by the outer limb of the groove (5), and the casing of the cutting discs passes through an edge cutout (4) of the head (1) of the glass cutter with a screw (10), a knurled nut (13) being guided on the screw and capable of being tightened against the head (1) of the glass cutter.

2. A glass cutter according to claim 1, wherein the support plate of the cutting discs has at the broad side facing the cover plate a number of recesses corresponding to the number of cutting discs, in which recesses the cutting discs are supported with their shafts and from which they only project with a portion of their cutting edges.

* * * * *